United States Patent [19]

Huber et al.

[11] Patent Number: 4,463,991
[45] Date of Patent: Aug. 7, 1984

[54] RELEASE VALVE APPARATUS FOR INDIRECT AIR BRAKES OF RAIL VEHICLES

[75] Inventors: Erich Huber; Johann Huber, both of Munich, Fed. Rep. of Germany

[73] Assignee: Knorr-Bremse GmbH, Munich, Fed. Rep. of Germany

[21] Appl. No.: 472,818

[22] Filed: Mar. 7, 1983

[30] Foreign Application Priority Data

Mar. 9, 1982 [DE] Fed. Rep. of Germany ....... 3208498

[51] Int. Cl.$^3$ .............................................. B60T 15/04
[52] U.S. Cl. ......................................... 303/69; 303/31
[58] Field of Search ..................... 303/69, 68, 70, 73, 303/74, 81, 71, 84 R, 84 A, 86, 48, 25–27, 4, 31, 36, 33, 37, 12

[56] References Cited

U.S. PATENT DOCUMENTS

| 3,117,823 | 1/1964 | Pickert | 303/69 |
| 3,177,043 | 4/1965 | Billeter | 303/69 |
| 3,407,008 | 10/1968 | May | 303/31 X |
| 3,497,270 | 2/1970 | Sauthoff et al. | 303/68 X |

Primary Examiner—Douglas C. Butler
Attorney, Agent, or Firm—Pollock, Vande Sande & Priddy

[57] ABSTRACT

Release valve apparatus capable of being actuated by the vacuum that can be created in a main air line (1) for indirect air brakes of rail vehicles, comprising a release valve (12) in a connection (pipes 8, 9) from the brake control valve (3) to the brake cylinder (10). The release valve (12) contains a piston controlled two-way valve (24, 27, 28), which unblocks the passage in the off position of the release valve (12). In the actuated position, on the other hand, it blocks passage and vents the connecting segment (pipe 9) on the brake cylinder side. The piston (13) of the release valve (12) is loaded in the off position operating on a smaller piston area by main air line pressure, and by opposing pressure in an admission area (15) which is under atmospheric pressure in the off position and during the switching process to the operating position, and in this position is impacted by pressure in the connecting segment (pipe 8) leading to the brake control valve (3). The release valve apparatus assures switching back from the operating to the off position when the pressure rises again in the main air line only after the brake control valve (3) has been switched to its release position; the release valve apparatus is therefore capable of being used both for graduated air brakes and for direct-release air brakes without having to accept an unnecessary pressure loss.

9 Claims, 2 Drawing Figures

RELEASE VALVE APPARATUS FOR INDIRECT AIR BRAKES OF RAIL VEHICLES

SUMMARY OF THE INVENTION

The invention involves a release valve apparatus capable of being actuated by the vacuum that can be created in a main air line for indirect air brakes of rail vehicles, with a release valve that is arranged in a connection leading from an air reservoir via a brake control valve and possibly a relay valve to a brake cylinder. The release valve in the off position unblocks a passage in the connection, and in its operative position closes the passage and connects the brake cylinder segment of the connection to the atmosphere. It has a two-way valve switched by a piston to switch the passage and the connection to the atmosphere. The piston divides two admission areas located opposite one another, one of which is constantly connected to the main air line, loading the piston in the switching direction of the two-way valve to unblock the passage when compressed air is admitted, and the other of which is subject to pressure in a segment of the connection leading to the brake control valve only when the passage is blocked and during the switching procedures for this purpose, and otherwise is discharged.

BACKGROUND OF THE INVENTION

A release valve apparatus of this kind is known, for example, from German Published patent application No. 1 530 242. According to this publication, the release valve is placed in that part of the connection which is between the air reservoir and the brake control valve. The other admission area in this release valve is always connected with atmosphere via a nozzle. The piston has a tappet to actuate the two-way valve, which has two stop valves switchable opposite one another. One of the two stop valves is located in a connection of two line segments discharging into the release valve. One of these line segments links the release valve with the air reservoir and the other line segment links it with the brake control valve. The other stop valve monitors a junction of the line segment leading to the brake control valve through a connecting bore in the tappet to the other admission area. In the rest position of the prior art valve the first stop valve is open and the two line segments are linked with one another, so that the brake control valve can feed air from the air reservoir to the brake cylinder during braking. The second stop valve is closed in this process, and the other admission area is thus under atmospheric pressure. When a vacuum impulse is injected into the main air line and thereby the one admission area, the release valve switches, dividing the two line segments from one another through closing the first stop valve, and, through opening the second stop valve, connecting the other admission area to the line segment leading to the brake control valve and thereby to the brake cylinder via the brake control valve, which is the brake position. Compressed air then streams from the brake cylinder through the second, open stop valve and the connecting bore of the tappet into the other admission area of the release valve and holds the release valve in its operative position through back pressure in this admission area, while at the same time this compressed air flows out of the other admission area via the nozzle to atmosphere. Through the back pressure in the other admission area the release valve is thus held in its operative position until the brake cylinder is almost completely emptied. At the latest when compressed air is again supplied to the main air line, the release valve returns to its off position. There is no assurance, however, that the brake control valve will be in its release position when the release valve returns to its rest position. If the brake control valve should still be in its braking position, compressed air will be supplied from the air reservoir into the brake cylinder and then, when the brake control valve reaches its release position, will be released again. The brief braking process that results can disturb operations and involves an unnecessary energy loss.

It is significant that, when the release valve is actuated, only the brake cylinder but not the air reservoir of the air brake is discharged.

The prior art release valve apparatus described above is suitable for use in graduated air brakes in which at the most one small, constant-pressure control air reservoir is provided in addition to the air reservoir. For direct-release air brakes, which often have an additional emergency brake reservoir in addition to the mentioned air reservoir to increase the pressure that can be injected into the brake cylinder during emergency stops, such release valve apparatus is not suitable. In emergency braking with these direct-release air brakes, the emergency brake reservoir is connected to the brake cylinder via the emergency brake part of the brake control valve, and thus is discharged together with the air reservoir when the release valve is actuated.

While a release valve that can be actuated through a vacuum injected into the main air line and is intended for direct-release air brakes of rail vehicles can be inferred from U.S. Pat. No. 1,765,152, this known release valve operates only through venting of the sole air reservoir provided. This release valve thus, in contrast to the previously described known release valve apparatus, causes a large loss of power through draining the total supply of air of the air brakes, and considerable time is required to release the brakes and subsequently recharge the air brakes.

Also known for direct-release, indirect air brakes of rail vehicles are release valves that are located in the area lying between the brake control valve and the brake cylinder of the connection extending from the air reservoir to the brake cylinder. A release valve of this kind can be inferred, e.g., from U.S. Pat. No. 3,117,823. These release valves, however, can be operated only manually; their piston serves only to keep the release valve open after brief manual actuation of the release valve until the brake cylinder has been completely discharged. Actuation of this known release valve through a vacuum induced in the main air line is not possible.

OBJECT OF THE INVENTION

The object of the invention is a release valve apparatus of the type described that can be actuated by a vacuum induced in a main air line in such a way that it is usable for direct-release air brakes too, while retaining all the advantages of the release valve devices of this kind that previously were only usable for graduated air brakes. In operation, it thus achieves both complete discharge of the brake cylinder and completely maintains the air in the air reservoir and in an additional emergency reservoir if such is provided and thereby obviates unnecessary energy loss. In addition, after its operation, and while the main air line is being recharged with compressed air, the release valve apparatus should prevent both the supply of compressed air into the brake cylinder via the brake control valve, which is sill in the braking position, while the release valve switches back to the off position, and then in the course of the subsequent release process, its being drained to atmosphere again via the brake control valve.

According to the invention, this object is achieved by locating the release valve in the area of the connection lying between the brake control valve and the brake cylinder, in a manner known per se, and by providing a device that permits switching back to the off position from the operating position when there is an increase in pressure in the main air line only if the brake control valve is in the release position.

Thanks to this design of the release valve apparatus, in direct-release braking during actuation of the release valve, even after emergency braking via the emergency brake section of the brake control valve, neither the air reservoir nor the emergency brake reservoir is discharged, but only the brake cylinder, while, with the subsequent rise in pressure in the main air line, a disturbing, brief brake application causing unnecessary loss of compressed air is precluded.

DESCRIPTION OF PREFERRED EMBODIMENT

Figure 1:
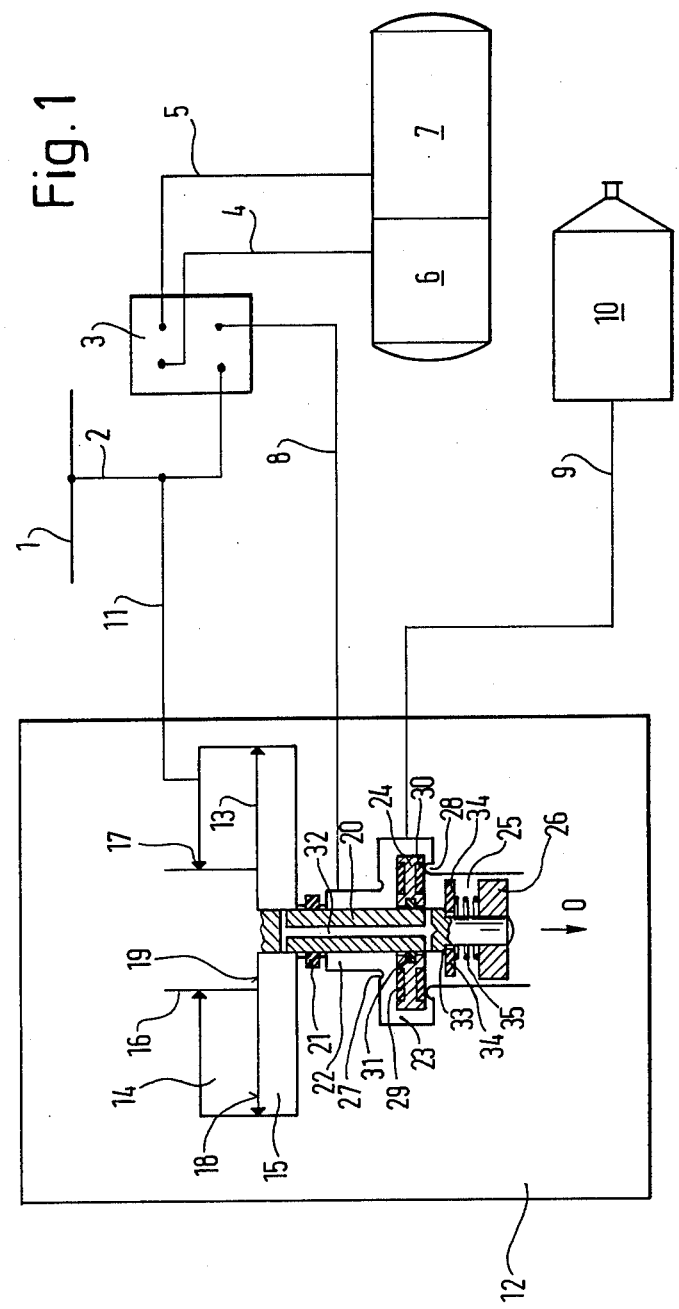
FIG. 1 and FIG. 2 illustrate two embodiments for release valve devices in accordance with the invention.

According to FIG. 1, a branch line 2 leads from a main air line 1 to an indirectly operating, direct-release brake control valve 3, which in turn is connected via pipes 4 or 5 with an air reservoir 6, often called an auxiliary air reservoir, and an emergency brake reservoir 7. The brake control valve 3 injects a brake pressure corresponding to the prevailing pressure in the main air line into a further pipe 8, which exits from the brake control valve 3. Finally one more pipe 9 leads to a brake cylinder 10. The pipes 8 and 9 can be connected with one another via a release valve 12, to which a sub-branch 11 of the branch line 2 also leads. The pipes 4 or 5 and 8, 9 thus constitute a connection 4, 5, 8, 9 from air reservoir 6 or emergency brake reservoir 7 to the brake cylinder 10.

As shown schematically in FIG. 1, release valve 12 comprises a piston 13 which separates two admission areas 14 and 15. The sub-branch 11 discharges into one admission area 14, so that the latter is constantly connected with the main air line 1. On the side of admission area 14, piston 13 has a cylindrical fitting 16, which is sealed with a sealing ring 17 and is slidable in the housing of release valve 12. The pressure in admission area 14 surrounding the fitting thus impacts only on a ring surface 18 of piston 13, while the remaining area 19 of the piston 13 is constantly impacted by atmospheric pressure. On the other hand, piston 13 has a tappet 20, which has a substantially smaller diameter than fitting 16. Tappet 20 protrudes into admission area 15, is arranged for movement in the housing of release valve 12 and sealed by means of a sealing ring 21, protrudes into an area 22, has a ring body 24 in a valve chamber connected to area 22, and terminates in a disc 26 in an area 25 adjoining valve chamber 23.

At the junctions from the areas 22 and 25 to the valve chamber 23 there are solidly housed valve seats 27 and 28, which face one another and between which the ring body 24 is located in such a way that, when placed on one of the valve seats 27 or 28, it has a certain distance from the other. The ring body 24, which has a valve seal 29 or 30 for each of valve seats 27 or 28, is sealed by means of its own sealing ring 31 and movably placed on tappet 20. Valve seats 27 and 28, together with ring body 24, thus form a two-way valve 24, 27, 28, which connects the valve chamber 23 either with area 22 or with area 25, which is connected cross-sectionally with atmosphere. Pipe 8 discharges into area 22 and pipe 9 into valve chamber 23. In tappet 20 there is a connecting bore 32, which on the one side always discharges into admission area 15 and on the other side discharges right under sealing ring 31 into area 25 when ring body 24 rests on valve seat 28 and the tappet 20 is in its lowest position. When tappet 20 is lifted, the lower orifice (as shown in FIG. 1) of connecting bore 32 can be ridden over by the sealing ring, so that it then discharges into area 22.

In area 25, tappet 20 is provided with a shoulder 33 turned away from piston 13, on which shoulder a disc 34, which is movably placed on the tapered tappet end, is pressed resiliently by means of a spring 35 which is supported against disc 26. Thus, spring 35 together with disc 34 constitutes a pre-tensioned spring loading, while disc 34 together with ring body 24 forms an impact coupling 24, 34, which has an idle stroke corresponding to their mutual distance.

In the off position of the release valve these parts assume the position shown in FIG. 1: The piston 13 with tappet 20 are in their lowest position, ring body 24 rests on valve seat 28 and connecting bore 32 discharges into area 25. Two-way valve 24, 27, 28 thus blocks pipe 9, and thereby brake cylinder 10 from area 25 and hence from atmosphere, and at the same time connects pipe 9 with brake cylinder 10 with pipe 8, and hence to brake control valve 3. In admission area 14, main air line pressure always prevails, while admission area 15 is discharged to area 25 via connecting bore 32. During braking and release operations, brake control valve 3 in the usual, known way controls the air pressure admission of the brake cylinder 10 via pipes 8 and 9 from air reservoir 6 or additionally from emergency brake reservoir 7 and the subsequent brake cylinder discharge to atmosphere. Release valve 12 meanwhile maintains its illustrated rest position.

For a remotely controlled release of the brakes via the main air line 1 a vacuum must be induced in the pressureless main air line 1 in connection with a braking procedure—a service brake application with pressure equalization between air reservoir 6 and brake cylinder 10 or an emergency or quick brake application with pressure equalization between air reservoir 6 and emergency brake reservoir 7, as well as brake cylinder 10. This vacuum makes its way from main air line 1 via branch line 2 and sub-branch 11 into admission area 14, in which low pressure thus occurs, against which the atmospheric pressure prevailing in admission area 15 raises piston 13 in accordance with FIG. 1. Tappet 20 is thereby shunted initially upwards in ring body 24, whereby the lower orifice of connecting bore 32 travels upward through sealing ring 31. During this process the brake cylinder pressure prevailing in valve chamber 23 keeps ring body 24 pressed onto valve seat 28. As soon as the exit of connecting bore 32 is above sealing ring 31, brake cylinder pressure from valve chamber 23 or area 22 reaches admission area 15 through connecting bore 32, as a result of which the pressure difference impacting piston 13 is substantially increased and piston 13 is forcefully raised. The pressure now existing in admission area 15 then pushes piston 13 all the way up even after the vacuum impulse in main air line 1 fades and atmospheric pressure is again established in admission area 14. After the exit of connecting bore 32 passes through sealing ring 31, disc 34 assumes a position on ring body 24, so that the latter is carried along via spring 35 when there is a further stroke of piston 13, rises from valve seat 28 and immediately assumes a position against valve seat 27. Two-way valve 24, 27, 28 is thereby switched; it now blocks pipes 8 and 9 from one another and connects pipe 9 via area 25 with atmosphere, as a result of which brake cylinder 10 is discharged rapidly. During a small residual stroke of piston 13, ring body 24 and disc 34 are held back by valve seat 27, so that spring 35 is slightly compressed and accordingly presses ring body 24 against valve seat 27. Ring body 24 thus cannot be pressed onto valve seat 27 with the full thrust exercised by piston 13, but only with the resilient force of spring 35, whereby the pressing of valve seat 27 in valve sealing 29 is limited so as to spare the latter.

The operative position of release valve 12 that has now been reached with discharged brake cylinder 10 is maintained so along as no pressure increase is induced in main air line 1. The brake pressure induced by brake control valve 3 in pipe 8 exists thereby via connecting bore 32, as mentioned above, in front of piston 13, and locks release valve 12 in its operative position.

When compressed air is subsequently again fed into main air line 1, the pressure increase established in admission area 14 at first is not able to press piston 13 down in accordance with FIG. 1, since it only acts on the smaller ring area 18 of piston 13. The pressure prevailing in admission area 15, pipes 8 and 4 or 5 and air reservoir 6 or emergency brake reservoir 6 has at this time an indefinite pressure level, since the original full brake or emergency brake pressure may have dropped more or less through leaks. As soon as the pressure increase induced in main air line 1 exceeds the prevailing pressure level in air reservoir 6 and the areas linked with it, brake control valve 3 is switched from the brake position it maintained up to that time to the release position, and discharges pipe 8 and with it admission area 15 to atmosphere. Only after this process can the main air line pressure meanwhile built up in admission area 14 force down piston 13, whereby, after disc 34 is again placed on shoulder 33, ring body 24 is also carried along through the friction of sealing ring 31 on tappet 20. A slight residual pressure still existing in area 22 facilitates the downward motion of ring body 24. Release valve 12 is thus switched back to its illustrated off setting, and its parts immediately reassume the positions shown in FIG. 1.

In order to assure the said downward movement of ring body 24, the latter can be coupled resiliently or positively with tappet 20 in a manner not shown in FIG. 1, operating in this direction too, or can be loaded by a spring supported against the valve housing.

It should be noted that, in the actuation of the release valve 12 and its return to the off position, no compressed air is discharged unnecessarily to atmosphere. Neither air reservoir 6 nor emergency brake reservoir 7 is discharged, but rather the pressure prevailing in them is maintained, aside from other losses through leaks, and when the line is switched back there is no disturbing short-term air pressure impact on brake cylinder 10.

Deviating from FIG. 1, release valve 12 can of course be used also in brake systems that have a graduated brake control valve of any design in place of the direct-release brake control valve 3. In this case, too, release valve 12 is to be disposed in the area lying between the brake control valve and the brake cylinder of the connection from the air reservoir to the brake cylinder, i.e., between the pipes corresponding to pipes 8 and 9.

Figure 2:
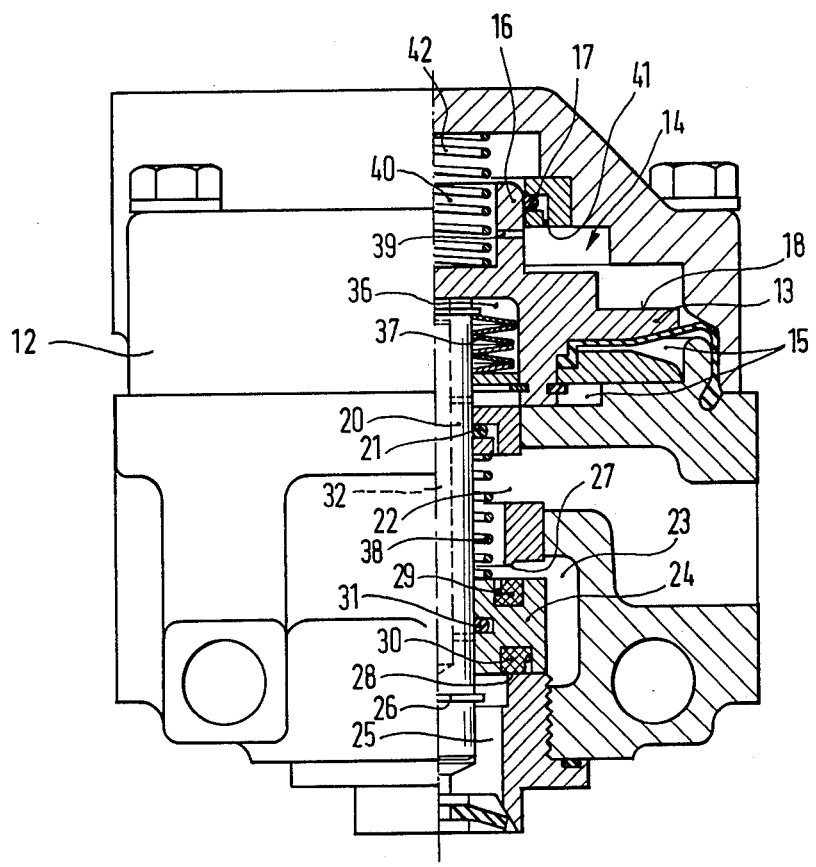

In order to increase the responsiveness of release valve 12 when the vacuum is induced in the main air line, release valve 12 can also be designed in accordance with FIG. 2. In the release valve according to FIG. 2, the parts corresponding to the release valve according to FIG. 1 are designated with the reference numbers used in FIG. 1.

In accordance with FIG. 2, tappet 20 protrudes into a cavity 365 of piston 13 and is pressed against piston 13 from below by a pre-tensioned spring 37 which is braced on the piston 13 on the other side; the spring 37 constitutes a pre-tensioned spring loading in this regard. Disc 26, which is fashioned as a safety ring, is located in the off position of release valve 12 with a certain distance—the idle stroke of the impact coupling 24, 26—below ring body 24; shoulder 33, disc 34 and spring 35 shown in FIG. 1 are not present. A spring 38 is stretched between the housing of release valve 12 and ring body 24, forcing the latter downwardly. Fitting 16 is pierced by a bore 39 right under sealing ring 17; the third admission area 40, which is delimited by area 19 of piston 13 as well as by fitting 16, for piston 13, which is thus fashioned as a differential piston, is cut off from atmosphere. Bore 39 together with sealing ring 17 thus forms a blocking device, which closes when piston 13 is raised through over-riding bore 39. Sealing ring 17 is fashioned as a groove ring with air admission bore 41 leading to admission area 14 as its groove. It hence acts as a check valve 17, 41, which opens in the direction of flow from admission area 40 to admission area 14 and which bridges over bore 39. In admission area 40 there is a spring 42 that loads piston 13 towards its off position.

In the off position of release valve 12 shown in FIG. 2, main air line pressure prevails not only in admission area 14 but also, via bore 39, in admission area 40. In addition, spring 42 holds piston 13 and spring 38 holds ring body 24 in the illustrated positions, corresponding to the off position. Otherwise the release valve according to FIG. 1 corresponds to the one in FIG. 1 in its construction, its connections and its pressure admissions.

If a vacuum is induced in the main air line after a complete or emergency brake application, this vacuum is effective not only in admission area 14 but, via bore 39, also in admission area 40. Piston 13 is thus impacted with low pressure on its whole surface, including ring surface 18 and area 19, and accordingly already with less low pressure than in the embodiment according to FIG. 1 is raised against the force of spring 42. The result thus is a greater responsiveness for the release valve in accordance with FIG. 2 with regard to vacuum actuation than in the embodiment according to FIG. 1. In FIG. 2, piston 13 carries along tappet 20 when it is raised via pre-tensioned spring 37. After overcoming the idle stroke, during which the lower exit of connecting bore 32 passes under sealing ring 31 and achieves a connection with valve chamber 23 or area 22, tappet 20 with its disc 26 comes to abut ring body 24 and carries the latter up with it for switching two-way valve 24, 27, 28.

During a subsequent, slight residual stroke of piston 13, spring 37 is slightly compressed. This spring 37 determines the maximum pressure force of valve seal 29 on valve seat 27 corresponding to spring 35 in FIG. 1. During the stroke of piston 13, bore 39 slides over the sealing ring 17, causing the separation of admission area 40 from admission area 14. Thus, bore 39 together with sealing ring 17 forms a blocking device which closes when piston 13 is raised through sliding over bore 39. Undesired pressure increases that may result during the stroke of piston 13 through reduction of the volume in admission area 40 are drawn off via check valve 17, 41 to admission area 14, which is initially still impacted by the vacuum and, after the latter fades, is under atmospheric pressure. Otherwise the processes described with reference to FIG. 1 go on during the establishment of the work position.

If compressed air is sent into the main air line and thereby into admission area 14 to switch back release valve 12 in accordance with FIG. 2, this compressed air cannot at first reach admission area 40. Conditions thus arise corresponding to the release valve according to FIG. 1, and the release valve according to FIG. 2 is thus also switched back to its off position at the earliest after return of the brake control valve to its release position and the related discharge of admission area 15. During the downstroke of piston 13 that takes place here, bore 39 again slides over sealing ring 17, so that admission areas 14 and 40 are again linked with one another and admission area 40 is filled with main air line pressure. Otherwise here, too, the procedures correspond to those in the embodiment according to FIG. 1, so that they need not be described further.

Naturally it is possible to put an ordinary relay valve, for example one controlled by the vehicle load, in pipes 8, 9 in addition to release valve 12.

What is claimed is:

1. Release valve apparatus for indirect air brakes of rail vehicles actuated by the vacuum that can be induced in a main air line (1), with a release valve (12) arranged in a connection (4 or 5; 8, 9) leading from an air reservoir (6) via a brake control valve (3) and possibly a relay valve to a brake cylinder (10), said release valve (12) in its off position opening a passage belonging to said connection (4 or 5, 8, 9), said release valve in its operative position closing said passage and connecting the brake cylinder segment of said connection (pipe 9) to atmosphere and having a two-way valve (24, 27, 28) switchable by a piston (13) to switch said passage and the connection to atmosphere, said piston (13) separating two admission areas (14, 15) lying opposite one another, one (14) of said admission areas, when impacted by pressure, loading said piston (13) in the switching direction of said two-way valve (24, 27, 28) to open said passage, being always connected to the main air line (1), the other said admission area (15) being impacted by pressure in a line segment (pipe 9) of said connection (4 or 5; 8, 9) leading to said brake control valve (3) only when said passage is closed and during switching procedures, and otherwise is discharged, said release valve (12) being in that area (pipes 8, 9) of said connection (4, or 5, 8, 9) which lies between said brake control valve (3) and said brake cylinder (10), and comprising a device permitting switching back from the operative position to the off position when the pressure in the main air line (1) rises only if said brake control valve (3) is in the release position.

2. Release valve apparatus according to claim 1, wherein said piston (13) has a first smaller piston area (ring area 18) bounded by said one admission area (14), which is connected to said main air line (1), and a second, larger piston area bounded by said other admission area (15).

3. Release valve apparatus according to claim 2, wherein said piston (13) is a differential piston a third piston area (19) of which operates in the same direction as said first piston area (18) and borders on a third admission area (40), and comprising a closing device (17, 39) controlled by said piston (13) connecting said third admission area (40) with said main air line (1) only during the position of said piston (13) corresponding to the off setting, and a check valve (17, 41) bridging over said closing device (17, 39) and opening in the direction of flow from said third admission area (40) to said main air line (1).

4. Release valve apparatus according to claim 3, wherein said piston (13) has a cylindrical fitting (16) which divides said first admission area (14) from said third one (40) and is movably sealed to a sealing ring (17) attached to the housing and has an opening (39) that can be slid over by said sealing ring (17).

5. Release valve apparatus according to any one of the preceding claims, wherein said two-way valve (24, 27, 28) has a ring body (24) bearing valve seals (19, 30) on both sides, said ring body being movably located on a tappet (20) linked with said piston (13) and sealed by means of a sealing ring (31) belonging to said ring body (24), said tappet (20) having a connecting bore (32) leading from said other admission area (15), and having an exit arranged so that it can be slid over by said sealing ring (31) of said ring body (24) and is connected with atmosphere in the off position and with the line segment (pipe 8) of said connection (4 or 5; 8, 9) leading to said brake control valve (3) in the operating position.

6. Release valve apparatus according to claim 5, wherein said tappet (20) and said ring body (24) can be coupled with one another in the switch direction to the actuated position through an impact coupling (24, 36 or 24, 26) that has an idle stroke.

7. Release valve apparatus according to claim 6, comprising a pre-tensioned spring-loading (spring 35 or 37) between said piston (13) and said ring body (24) in series with said impact coupling (24, 34 or 24, 26).

8. Release valve apparatus according to claim 7, wherein said piston (13) is loaded in the direction of movement towards the off position by a spring (42) and is coupled elastically with said tappet (20) in the opposite direction of movement via the spring-loading (spring 37).

9. Release valve apparatus according to claim 5, wherein said ring body (24) is loaded by a spring (38) in the direction of movement towards the off position.

* * * * *